United States Patent
Psota et al.

[15] 3,661,484
[45] May 9, 1972

[54] AUTOMATIC CONTAINER MAKING APPARATUS

[72] Inventors: Joseph M. Psota, Hawthorne; Joel A. Hamilton, Englewood; Russell D. Di Donato, Nutley, all of N.J.

[73] Assignee: Mahaffy & Harder Engineering Company, Totowa, N.J.

[22] Filed: Feb. 12, 1970

[21] Appl. No.: 10,822

[52] U.S. Cl. ...........................425/109, 106/38.22, 425/384, 425/388, 53/184
[51] Int. Cl. .......................................................B29c 17/02
[58] Field of Search ........................18/4 B, 5 A, 5 F, 5 P, 6 R, 18/17 H, 16 P, 19 R, 19 N, 19 F, 35, 2 F, 38, 47 C, 5.3 F, 5.3 P, 5.3 H, DIG. 13, 39, 44, 55; 165/185; 263/2; 156/306, 588, 590, 597; 100/93 P, 211, 295

[56] References Cited

UNITED STATES PATENTS

| | | | |
|---|---|---|---|
| 3,106,630 | 10/1963 | Klamp | 100/93 P |
| 3,361,608 | 1/1968 | Janetos et al. | 100/93 P X |
| 3,188,266 | 6/1965 | Chorbonneau et al. | 156/306 X |
| 2,478,165 | 8/1949 | Collins | 18/47 C UX |
| 2,927,620 | 3/1960 | Elliott | 18/17 H X |
| 3,271,214 | 9/1966 | Tabor | 100/93 P X |

*Primary Examiner*—Robert L. Spicer, Jr.
*Attorney*—Bryan, Parmelee, Johnson & Bollinger

[57] ABSTRACT

An automatic packaging machine of the type adapted to form packages from continuous rolls of plastic film. The machine includes an improved heating arrangement to apply heat directly to a plastic film while the film is maintained in its original plane of motion along a defined path prior to formation into cups. This heating arrangement includes a heated platen positioned for reciprocating contact with one surface of the film. An elastomeric member is synchronized for movement with the heated platen so as to engage the opposite surface of the film and press it into heat transfer contact with the platen. The elastomeric member has a configuration matching the outline of the film area to be heated.

9 Claims, 3 Drawing Figures

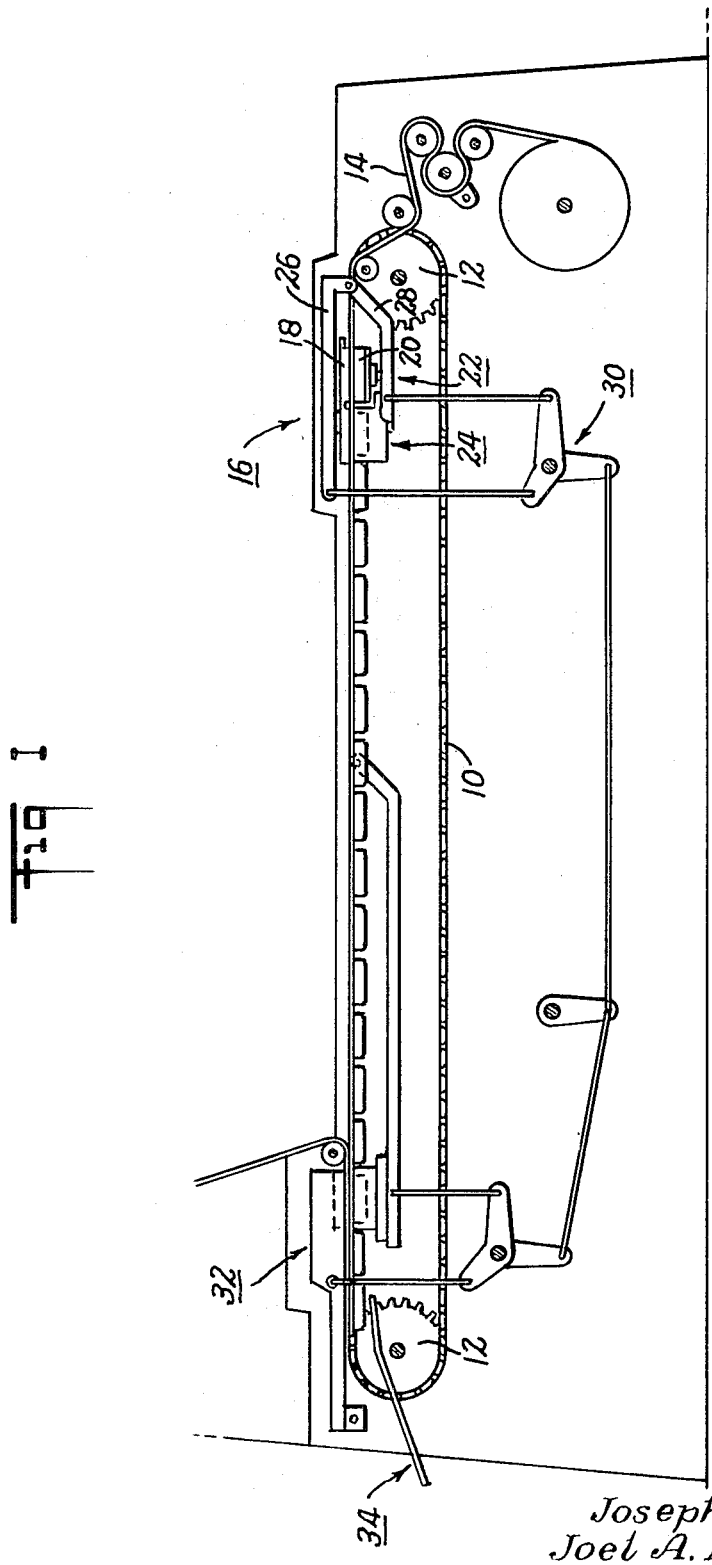

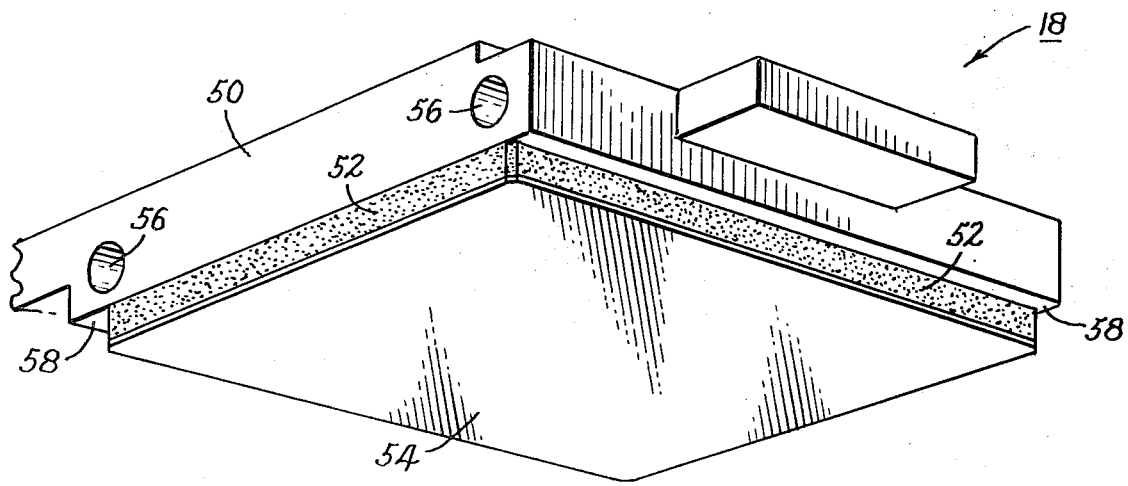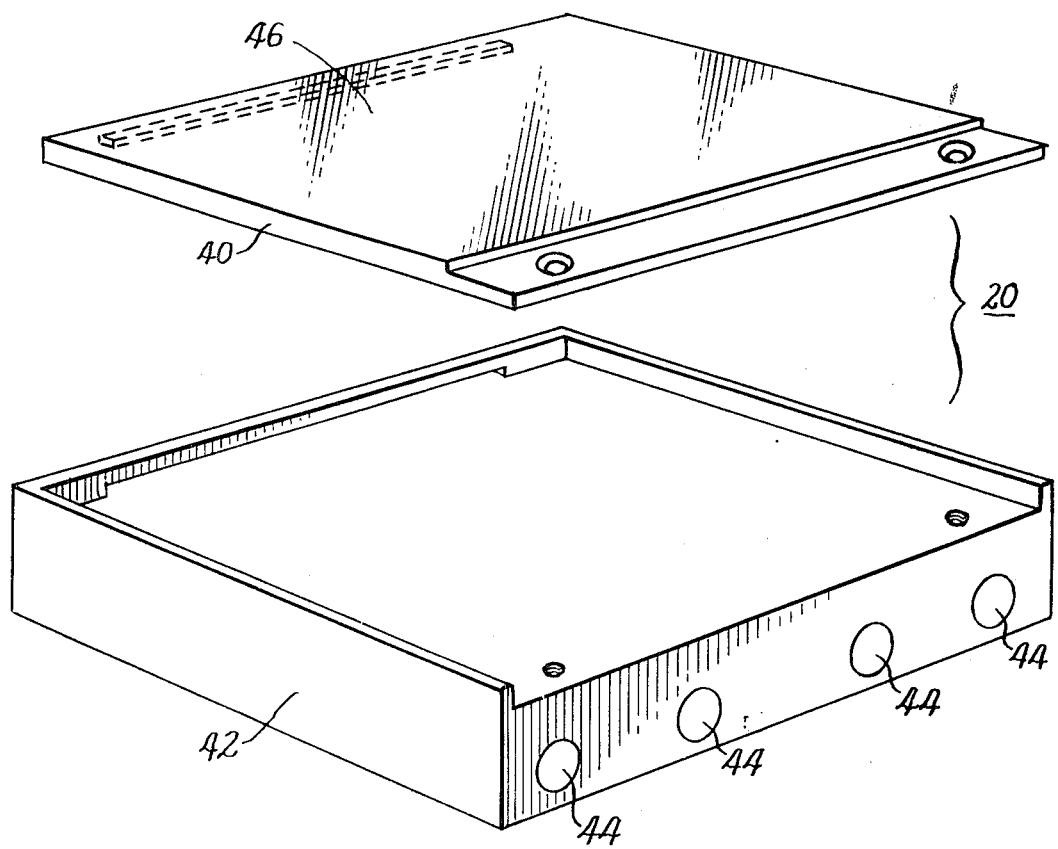

AUTOMATIC CONTAINER MAKING APPARATUS

This invention relates to automatic packaging apparatus adapted to form plastic containers of cup shape. More particularly, this invention relates to such apparatus having improved means to heat the plastic to thermoforming temperature. Apparatus in accordance with the invention is particularly well suited for making packages of so-called semi-rigid plastic sheet, but can be used in forming packages from other classes of plastic film materials.

Various types of apparatus for automatic packaging are known in the prior art. High-speed packaging machines typically form packages from roll stock, i.e., rolls of plastic packaging material. The widely accepted moving-tray machines, as shown for example in U.S. Pat. No. 3,061,984, have utilized a radiant heater system for softening the film prior to forming.

However, radiant heater systems have a number of drawbacks. For example, it is difficult with such systems to properly control the areas which are heated, and it is difficult to apply the heat uniformly. One factor tending to create unequal heat distribution is that the film tends to buckle when heated, so that some regions are moved closer to the heater than other regions. Also, radiant heaters are relatively inefficient, because considerable heat energy is lost by radiation and by convection. The heating element must operate at a temperature much higher than that to which the film is to be heated; thus, special provision must be made to prevent damage to the film while the machine is stopped. Moreover, the radiant heater systems are in any event relatively expensive.

Application Ser. No. 840,131, filed by J. A. Hamilton on July 1, 1969, shows another technique for heating the plastic film. In this arrangement, the film is drawn by vacuum up against a heated member having a slightly concave shape, thereby to transfer the heat by direct contact. This approach has not been fully satisfactory in certain applications. For example, it has been found difficult to properly heat films of relatively large area. Also, semi-rigid films cannot readily be heated in this fashion because the edge portions tend not to contact the heated member until late in the cycle. And, finally, such apparatus has been found to be relatively expensive to make.

Some efforts have been made to solve these problems. Thus it has been found that, for flexible films of relatively large area, full contact over the film area can be achieved by making the platen of somewhat porous material so that no air pockets will be trapped to prevent contact. However, a porous material is inherently a relatively poor heat conductor and this factor limits the heating efficiency of the system.

It has been suggested that two heated metal members be reciprocably mounted on opposite sides of the film to contact and heat the film directly from both sides simultaneously. However, such a system not only is expensive to make, but moreover tends to cause severe marking of the film.

Accordingly, it is a general object of this invention to provide an improved packaging apparatus adapted to form plastic film into containers. A more specific object is to provide such packaging apparatus with superior means to heat plastic (including semi-rigid sheet) to thermoforming temperature in a relatively short period of time. Still another object is to provide such an apparatus which is simple and economical to construct and operate, and adapted to form containers having a wide variety of sizes and shapes.

In one embodiment of this invention to be described hereinbelow, the plastic sheet is maintained in its plane of motion throughout the heating operation, i.e., no special means are provided for moving the film up or down out of its defined path of movement in the packaging apparatus. The heat is supplied by a heated platen which contacts one side of the film while a resilient member on the other side presses the film lightly yet firmly against the heated platen. Thereafter, the platen and resilient member move away from the film which is immediately shifted to a vacuum-drawing station where the heated plastic is stretched into a container of generally cup-shape, to be filled and sealed in subsequent stations of the machine.

Other objects, aspects and advantages of the present invention will be apparent from the following description considered together with the accompanying drawings, in which:

FIG. 1 is an elevational longitudinal sectional view showing the main operating elements of a packaging machine incorporating the present invention;

FIG. 2 is an exploded perspective view of the elements for heating the plastic film.

Figure 3:
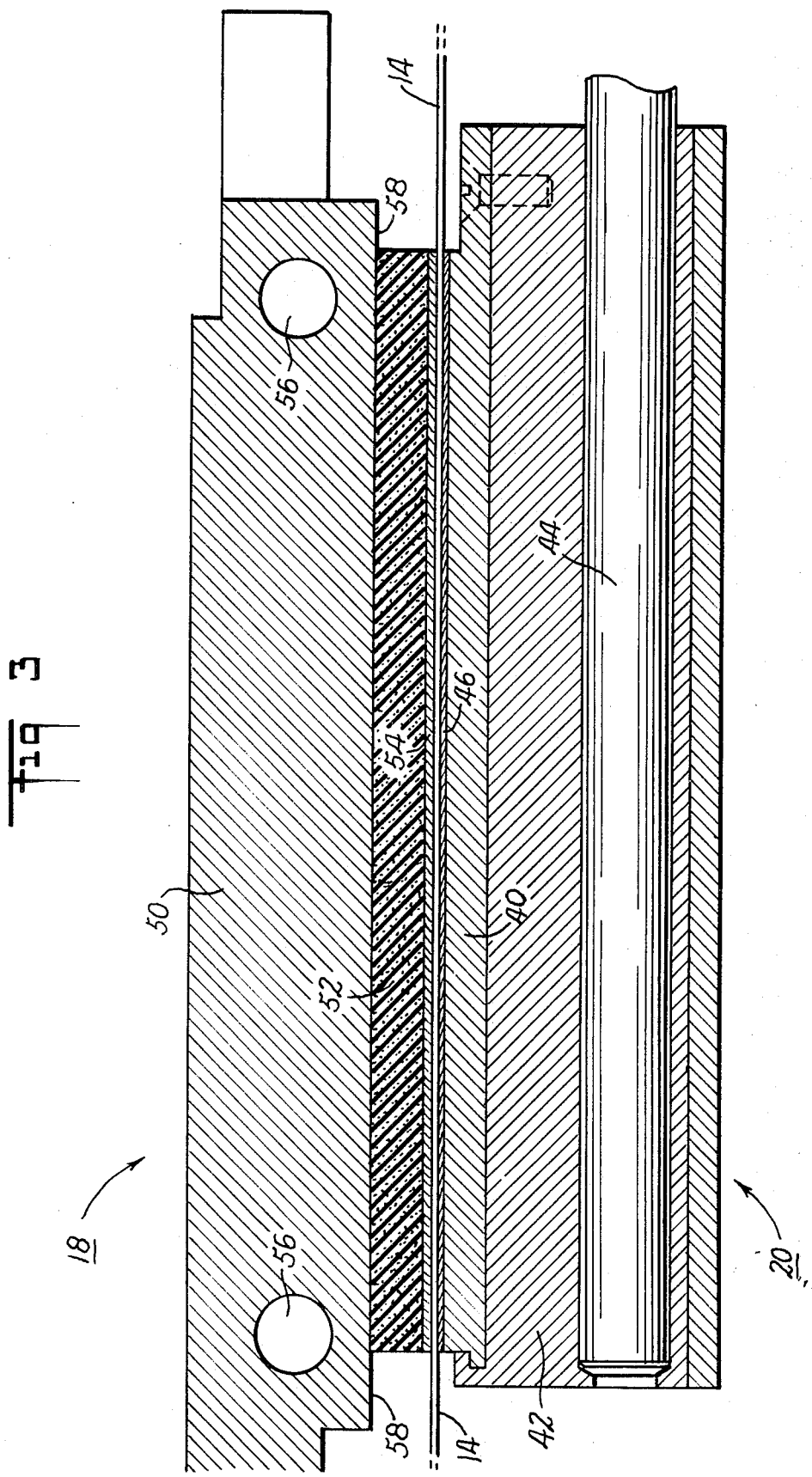
FIG. 3 is an elevational sectional view of the film heating elements.

Referring now to FIG. 1, there is shown a packaging machine of the general type disclosed in the above-identified copending application Ser. No. 840,131. This machine includes a pair of side-by-side endless chains 10 which are moved intermittently by sprockets 12, and which carry a series of inwardly facing clips (not shown herein) arranged to grip the side edges of a continuous sheet 14 of plastic packaging film. Operations are performed on the plastic sheet at successive stations along the path of movement (from right-to-left along the upper reaches) to form the material into cups which are filled and hermetically sealed in known fashion.

The plastic film 14 is heated and drawn into cup shape at a heating and forming position generally indicated at 16. The apparatus at this position includes upper and lower reciprocable members 18 and 20 which cooperate to define a film-heating station 22 preceding a conventional vacuum-drawing station 24. The operating elements of both stations are secured to pivoted arms 26 and 28 on opposite sides of the film. These arms are reciprocated by rocker means 30 in synchronism with the indexing of the film. After the heated plastic is formed into cups at the vacuum-drawing station 24, it continues to move along the defined horizontal path to an evacuating and sealing station 32 where the cups are covered and sealed to form a complete package. The completed package is discharged at a discharge station 34.

Referring now to FIGS. 2 and 3, the lower member 20 of the film-heating station 22 includes a smooth, flat platen 40 of a good heat conducting metal, such as aluminum, secured to a support block 42, also of aluminum. This support block carries conventional electrical heating elements 44 the current through which is controlled by a conventional temperature control system (not shown) so as to maintain a pre-set temperature at the top surface of the platen. The platen is covered with a thin but uniform coating of heat-resistant release material 46 consisting in the preferred embodiment of Teflon (polytetrafluoroethylene).

The upper member 18 of the film-heating station 22 includes a support block 50 made of a good heat conducting metal such as aluminum, and to which is secured a resilient member 52 formed of an elastomeric material, preferably silicone foam rubber, of relatively spongy consistency. This layer of foam rubber may be adhesively secured to the support block, or other appropriate readily releasable fastening means may be employed. The lower surface 54 of the foam rubber member is coated with a thin but uniform layer of heat-resistant release material such as Teflon. Support block 50 also is equipped with passages 56 through which cooling water may be circulated, to maintain the working surface 54 of the foam rubber at a relatively low temperature with respect to the platen 40.

The working surface of the platen 40 may be geometrically identical to the film area to be heated, or it may be larger, if mechanically convenient. Thus, a square or rectangular working surface can suffice for heating either a round or a rectangular film area. Similarly, the area 58 of the upper support block 50 may be the same as the film area to be heated, or it may be larger (as shown) if mechanically convenient.

The foam rubber member 52, with its layer of release material 54, are dimensioned to exactly the size and shape of the film area to be heated and subsequently vacuum-drawn into cup-shape. This is because heat is supplied essentially only to the film region which is compressively engaged by the resilient member. Therefore, it is necessary only to replace this member to accommodate any change in size or shape of the film region to be drawn, within the surface area limitations of the platen 40 and the upper support block area 58. Nevertheless, for practical reasons, it may be preferred, when making a change in size or shape of the drawn cup area, to replace the entire heating and vacuum-drawing equipment, i.e., the parts above the film as one integral section, and the parts below as a second integral section, particularly in order to assure proper repeat spacing to the evacuation and sealing station 32.

During the "dwell period" between advancing movements of the film, the compressive action of the foam rubber member 52 forces the film 14 gently yet firmly against the heated platen 40 to provide efficient and uniform heat transmission to the film in a relatively short period of time. Air bubbles are effectively removed by this compressive action, and the effect of minor wrinkles in the film is minimized. This procedure allows the packaging machine to operate efficiently, without injuring the film. In particular, there is no significant impairment of the optical properties of the plastic film, so that the package will present a good view of the contained product to a prospective customer.

It should be noted that many packaging films in use today consist of two (or more) laminated layers combined to optimize performance. Typically the layer of lower melting temperature is on the "inside" (i.e., the side which will be heat-sealed to the top sheet of plastic), usually to facilitate heat sealing. In the arrangement disclosed herein, the heated platen 40 is arranged to contact the "outside" layer of the laminated film 14. This avoids requiring the inside layer to transmit to the outside layer an amount of heat which may be excessive for the inside layer, and which might damage the inside layer, or alter its optical properties within the region of forming.

The heated platen 40 need be maintained at a temperature only slightly in excess of the softening temperature of the plastic film, so possible damage to the film 14 is reduced. For example, temperatures around 325° F. have been found effective. The compressive heat transfer action allows heat to be transmitted efficiently and uniformly to the film because of the intimate contact with the film, particularly due to use of the release-coated compressible elastomeric member 52 pressing the film area against the release coating of the platen 40. A wide variety of plastic films and film laminations, flexible and semi-rigid, may be heated successfully by this arrangement.

Although a specific embodiment of the present invention has been described above, it should be understood that this is not to be construed in a limiting sense and that various modifications of the invention will be apparent to one skilled in the art, within the scope of the appended claims.

We claim:
1. An apparatus for making a container, said apparatus being of the type wherein a plastic sheet is thermoformed into a cup-shaped container to be filled and sealed, said apparatus including means for moving the plastic sheet past a series of operating stations at one of which the plastic is heated to forming temperature; the apparatus further including stretch-forming means at a station subsequent to said heating station for stretching a segment of the plastic sheet into a cup-shaped container;
   apparatus for heating a segment of the plastic sheet to a temperature at which it can be stretched by said stretch-forming means into a cup-shaped container comprising:
   a heated platen positioned on one side of the plastic sheet at said one station;
   a resilient member positioned on the other side of said plastic sheet at said one station;
   operating means for effecting relative movement to bring said platen into surface contact with said one side of the sheet with said resilient member in compressive engagement with the other side of said sheet, directly opposite said platen, said compressive engagement being throughout said segment subsequently to be stretched into a container, said compressive engagement serving to establish a heat transfer contact between said sheet and said platen while maintaining the physical characteristics of the sheet conditioned for use as a container;
   said operating means including means arranged to maintain said heat transfer contact for a period of time long enough to raise the temperature of said plastic sheet segment sufficiently to permit it to be stretched into cup shape, without reaching a temperature sufficiently high to adversely affect the plastic sheet properties required for use as a container; and
   means to advance said heated plastic sheet segment to said stretch-forming station and means to stretch the heated material at that station into a cup-shaped container.

2. Apparatus as claimed in claim 1, wherein said platen is made of metal and presents to the sheet of plastic a smooth, flat surface parallel to the plane of the plastic sheet at the region of contact.

3. Apparatus as claimed in claim 1, wherein said resilient member comprises a layer of elastomeric material.

4. Apparatus as claimed in claim 3, wherein said elastomeric material is foam rubber.

5. Apparatus as claimed in claim 1, wherein said resilient member is compressible and is formed into a shape presenting a working surface corresponding to the area of plastic to be formed into a container.

6. Apparatus as claimed in claim 1, wherein said heated platen is covered with a layer of release material assuring that the heated plastic will not stick to said platen upon withdrawal of the platen from contact with the film surface.

7. Apparatus as claimed in claim 1, wherein said resilient member is covered with a layer of release material assuring that the heated plastic will not stick to said member upon withdrawal thereof from contact with the plastic surface.

8. Apparatus as claimed in claim 1, including means for cooling the resilient member to a temperature substantially lower than the temperature of said platen.

9. Apparatus as claimed in claim 1, wherein the sheet of plastic comprises a laminate with at least two layers of film, one layer having a lower softening temperature than the other, said platen being arranged to engage the exposed surface of said layer of film which has the higher softening temperature.

* * * * *